(12) United States Patent
Masson et al.

(10) Patent No.: US 10,073,260 B2
(45) Date of Patent: Sep. 11, 2018

(54) METHOD FOR REDUCING SPECKLE (71) Applicant: Intel Corporation, Santa Clara, CA (US)

(72) Inventors: Jonathan Masson, Pully (CH); Nicolas Abele, Lausanne (CH)

(73) Assignee: INTEL CORPORATION, Santa Clara, CA (US)

( * ) Notice: Subject to any disclaimer, the term of this patent is extended or adjusted under 35 U.S.C. 154(b) by 150 days.

(21) Appl. No.: 14/762,449

(22) PCT Filed: Jan. 21, 2013

(86) PCT No.: PCT/EP2013/051019
§ 371 (c)(1),
(2) Date: Jul. 21, 2015

(87) PCT Pub. No.: WO2014/111163
PCT Pub. Date: Jul. 24, 2014

(65) Prior Publication Data
US 2015/0355474 A1    Dec. 10, 2015

(51) Int. Cl.
*G03B 21/20* (2006.01)
*H04N 9/31* (2006.01)
(Continued)

(52) U.S. Cl.
CPC ....... *G02B 26/001* (2013.01); *G02B 26/0833* (2013.01); *G02B 26/105* (2013.01);
(Continued)

(58) Field of Classification Search
CPC ............ G03B 21/2033; G03B 21/2006; G03B 21/206; G03B 21/208; H04N 9/3129; H04N 9/3152; H04N 9/3161; H04N 9/3164; G02B 26/001; G02B 7/1066; G02B 27/48; G02B 27/144
(Continued)

(56) References Cited

U.S. PATENT DOCUMENTS 5,861,991 A *  1/1999 Fork .................... G02B 27/145
                                                        359/618
6,587,182 B1   7/2003 Goto
(Continued)

FOREIGN PATENT DOCUMENTS

JP    2010152178 A *  7/2010
KR    2008-0009538      1/2008
(Continued)

OTHER PUBLICATIONS

International Search Report, dated Oct. 4, 2013, Application No. PCT/EP2013/051019, Filed Date: Jan. 21, 2013, pp. 3.
(Continued)

*Primary Examiner* — Ryan Howard (57) ABSTRACT

According to the present invention there is provided a method of reducing speckle effects in a projected image which is displayed on a display surface, comprising the steps of transmitting an input light beam to a first interferometer, generating a plurality of primary transmit beams at the first interferometer using the input light beam, using the plurality of primary transmit beams to generate interference fringes at a display surface.

18 Claims, 11 Drawing Sheets

(51) Int. Cl.

| | | |
|---|---|---|
| | *G02B 27/48* | (2006.01) |
| | *G02B 26/00* | (2006.01) |
| | *G02B 26/08* | (2006.01) |
| | *G02B 26/10* | (2006.01) |
| | *G02F 1/13* | (2006.01) |
| | *G02B 27/10* | (2006.01) |

(52) U.S. Cl.
CPC ......... *G02B 27/1066* (2013.01); *G02B 27/48* (2013.01); *G02F 1/1313* (2013.01); *H04N 9/3129* (2013.01); *H04N 9/3164* (2013.01); *G03B 21/2033* (2013.01); *H04N 9/3161* (2013.01)

(58) Field of Classification Search
USPC ........................................ 359/583, 578, 577
See application file for complete search history.

(56) References Cited

U.S. PATENT DOCUMENTS

2004/0257664 A1  12/2004  Hashimoto
2008/0049284 A1   2/2008  Park et al.

FOREIGN PATENT DOCUMENTS

| KR | 100828365 B1 * | 5/2008 |
|---|---|---|
| KR | 2010-0113789 | 10/2010 |
| WO | 2012/070651 A1 | 5/2012 |

OTHER PUBLICATIONS

Office Action received for Korean Patent Application No. 2015-7019840, dated May 16, 2016, 12 pages including 6 pages English translation.

\* cited by examiner

METHOD FOR REDUCING SPECKLE

FIELD OF THE INVENTION

The present invention concerns a method for reducing speckle, and in particular but not exclusively a method for reducing speckle in a projected pixel (or pixels) by means of interference fringes which are generated by overlapping the beam spots from multiple light beams, at a display screen.

DESCRIPTION OF RELATED ART

A speckle pattern is an intensity pattern produced by the mutual interference of a set of wavefronts. In image projection systems which use lasers, Speckle patterns are caused by coherent light interferences which occur on rough display surfaces. Speckle reduces the quality of a projected image as each pixel of a projected image will have a non-uniform intensity; for each pixel of the projected image certain areas of the pixel will appear brighter than other areas of the pixel. The non-uniform intensity of a pixel caused by speckle patterns is referred to in the art as "speckle effects".

In order to reduce the effect of speckle in projection systems, it is known to generate multiple speckle patterns for each pixel; for each pixel the multiple speckle patterns are arranged to partially overlay each other and the variation in the brightness across the pixel is reduced as a result. The more speckle patterns which are generated for each pixel, the greater the reduction in the variation in the brightness across the pixel which can be achieved.

One of the difficulties which this solution is that multiple speckle patterns must be generated for a pixel before the projection system projects the next pixel; thus the multiple speckle patterns must be generated within a very short time period. Accordingly projection system which provide multiple speckle patterns for each pixel require large processing power.

Furthermore, the number of speckle patterns which can be generated for each pixel is limited by the procession power of the projection system. Thus, there is limit to the reduction in the variation in the brightness across the pixel which can be achieved.

Additionally, to achieve a reduction in the variation in the brightness across the pixel the multiple speckle patterns must not fully overlay each other (the multiple speckle patterns must each partially overlay each other); while at the same time each of the multiple speckle pattern must be projected within a predefined area of the pixel, otherwise the pixel will appear blurred. It is difficult to ensure that each of the multiple pixel patterns are both, projected within the predefined area of the pixel and also do not fully overlay each other.

Another solution to reduce the effect of speckle in projection systems is the use of interference fringes. Interference fringes are light and dark bands produced by the interference and diffraction of light. It is known split light into two beamlets using a Michelson interferometer and to recombine the beamlets at a display surface. When the beamlets are recombined interference fringes are produced due to constructive and destructive interference between the beamlets. The interference fringes reduce speckle because independent speckle patterns are generated by each individual fringe within the resolution spot of the viewer. The resolution spot of the viewer is the smallest feature size that can be distinguished on the screen by the viewer at a specific distance. The multiple speckle patterns within the resolution spot do not overlap and are independent, thus they are averaged by the viewer's eye and the speckle contrast is reduced.

Disadvantageously, this solution requires two mirrors; a first mirror to reflect one of the beamlets to the display screen and a second mirror to deflect the other beamlet to the display screen.

Furthermore, as only two beamlets can be recombined; as a result very few interference fringes are provided in the resolution spot of the viewer and therefore there is a poor reduction in speckle.

Additionally, for projection systems which use an oscillating mirror to scan a projection beam across a display surface, the oscillating mirror must always be arranged so that it scans light output from the Michelson interferometer. If the oscillating mirror is arranged so that it scans light which is input to the Michelson interferometer, then the beamlets will not recombine on the display surface and no interference fringes will be formed. Disadvantageously, as the oscillating mirror must always be arranged so that it scans light output from the Michelson interferometer, the oscillating mirror must be large enough so that it can receive the two beamlets.

It is an aim of the present invention to obviate or mitigate at least some of the above-mentioned disadvantages.

BRIEF SUMMARY OF THE INVENTION

According to the invention, there is provided a method of reducing speckle effects in a projected image which is displayed on a display surface, comprising the steps of, transmitting an input light beam to a first interferometer, generating a plurality of primary transmit beams at the first interferometer using the input light beam, using the plurality of primary transmit beams to generate interference fringes at a display surface.

The step of generating a plurality of primary transmit beams at the first interferometer using the input light beam may comprise generating more than two primary transmit beams at the first interferometer using the input light beam.

The step of using the plurality of primary transmit beams to generate interference fringes may comprise, transmitting the primary transmit beams to a position on a display surface so that beam spots, which are generated by the plurality of primary transmit beams, at least partially overlap.

Preferably the method comprises the step of using the plurality of primary transmit beams to generate interference fringes comprises, transmitting the primary transmit beams to a position on a display surface so that beam spots which a generated by the plurality of primary transmit beams, fully overlap each other.

Preferably the method further comprises the step of using the primary transmit beams which are transmitted to a position on the display screen to define an image pixel. Preferably the method comprises the step of focusing the plurality of primary transmit beams to a single point on a display surface so that beam spots, which are generated by the plurality of primary transmit beams, define a single image pixel at said point.

The step of using the plurality of primary transmit beams to generate interference fringes may comprise the steps of, transmitting the primary transmit beams to a second interferometer, generating a plurality of secondary transmit beams at the second interferometer using each of the primary transmit beams, transmitting the secondary transmit beams to a position on a display surface so that beam spots, which are generated by the plurality of secondary transmit beams, at least partially overlap.

Preferably the method comprises the step of transmitting the secondary transmit beams to a position on a display surface so that beam spots, which are generated by the plurality of secondary transmit beams, fully overlap.

Preferably the method further comprises the step of using the secondary transmit beams which are transmitted to a position on the display screen to define an image pixel. Preferably the method comprises the step of focusing the plurality of secondary transmit beams to a single point on a display surface so that beam spots, which are generated by the plurality of secondary transmit beams, define a single image pixel at said point.

Preferably each of the plurality of primary transmit beams pass along a first plane. Preferably, each of the secondary transmit beams which are generated from each primary transmit beam pass along a second plane. The first and second planes are preferably perpendicular to one another.

The step of transmitting an input light beam to the first interferometer may comprise directing a light beam from a light source to the first interferometer using a MEMS mirror which oscillates about at least one oscillation axis to scan the input light beam.

The MEMS mirror is preferably positioned along an optical path between the light source and first interferometer. Advantageously, providing the MEMS mirror before the interferometer will ensure that the a smaller MEMS mirror is required since the MEMS mirror is required to scan the input light beam only, compared to if the MEMS mirror was provided after the interferometer in which case the MEMS mirror would need to be larger enough to receive, and scan, each of the plurality of primary transmit beams.

Preferably the method further comprises the step of measuring the distance between a light source which provides the input light beam and point on the display surface. Preferably the method further comprises the step of using an actuator to move the beam splitter and/or mirror such that the primary or secondary transmit beams will be focus to said single point on the display surface at the measured distance. Using the measured distance the system, the actuator can determine the angle between a beam splitter required so that the transmit beams are focus to the single point on the display surface. If, for example, the method of the present invention is carried out in a projection system, if the user moves a projection system to change the distance between a light source and the point on the display surface, then the method may comprise the step of adapting automatically the focus according to the changed distance, so that the image remains sharp; in other word the system will autofocus. For example if the distance between the projector and the projection surface is increased, then the angle between first and/or mirror and the first and/or second beam splitter may be decreased. The method of the present invention may comprise the step of adjusting the angle between a beam splitter and a mirror of the first and/or second interferometer.

Preferably the method further comprises the step of measuring the distance between a light source which provides the input light beam and a plurality of points on the display surface. Using the actuator to adjust the angle between a beam splitter and a mirror of the first and/or second interferometer, to change the point on the display surface at which the primary or secondary transmit beams focus, for every pixel.

The first interferometer may comprise a first beam splitter arranged in optical communication with a first mirror, and wherein the method may further comprise the step of moving the first mirror of the first interferometer and/or moving the first beam splitter of the first interferometer. The first mirror and/or first beam splitter may be oscillated about a pivot point.

The second interferometer may comprise a second beam splitter arranged in optical communication with a second mirror, and wherein the method may further comprise the step of moving the second mirror of the second interferometer and/or moving the second beam splitter of the second interferometer. The second mirror and/or second beam splitter may be oscillated about a pivot point.

The first interferometer may comprise a first beam splitter which is configured to provide a plurality of primary transmit beams by means of partial internal reflection. The method may further comprise the step of moving the first beam splitter of the first interferometer. The first beam splitter may be oscillated about a pivot point.

The second interferometer may comprise a second beam splitter which is configured to provide a plurality of secondary transmit beams by means of partial internal reflection of the primary transmit beams. The method may further comprise the step of moving the second beam splitter of the first interferometer. The second beam splitter may be oscillated about a pivot point The first interferometer may comprise a first beam splitter arranged in optical communication with a first mirror and the step of generating a plurality of primary transmit beams at the first interferometer may comprise the steps of, transmitting an input light beam to a first beam splitter; splitting the light beam using the first beam splitter to form a first light beam which is reflected from the first beam splitter to form a first primary transmit beam and a second light beam which is transmitted through the first beam splitter; passing the second light beam to the first mirror and reflecting the second light beam, using the first mirror, back to the first beam splitter; splitting the second light beam using the first beam splitter to form a third light beam which forms a second primary transmit beam, and a fourth light beam; reflecting the fourth light beam back to said first mirror, using the first beam splitter; using the fourth light beam to generate a plurality of primary transmit beams, wherein each of the plurality of primary transmit beams are generated by splitting a light beam which has been reflected from the first mirror to the first beam splitter to form a primary transmit beam and a reflective beam which is reflected back to the first mirror.

The first interferometer may comprise a first beam splitter and first mirror which are arranged in optical communication, and wherein the first beam splitter may have a planar surface and the first mirror may have a planar reflective surface, and wherein the method may further comprise the step of arranging the first mirror and/or first beam splitter of the first interferometer so that the planar reflective surface of the first mirror is off-set from being parallel to the planar surface of the first beam splitter.

Preferably the method comprises the step of arranging the first mirror and/or first beam splitter of the first interferometer so that the planar reflective surface of the first mirror is orientated at an angle of between 0.001°-90° to the planar surface of the first beam splitter. Most preferably the method comprises the step of arranging the first mirror and/or first beam splitter of the first interferometer so that the planar reflective surface of the first mirror is orientated at an angle of between 0.01°-2° to the planar surface of the first beam splitter.

The first interferometer may comprise a first beam splitter and first mirror which are arranged in optical communication, and wherein the first beam splitter may have a planar surface and the first mirror may have a planar reflective surface, and wherein the method may further comprise the step of arranging the first mirror and/or first beam splitter of the first interferometer so that the planar reflective surface of the first mirror is parallel to the planar surface of the first beam splitter.

The second interferometer may comprises a second beam splitter arranged in optical communication with a second mirror and wherein the step of generating a plurality of secondary transmit beams at the second interferometer using the primary transmit beams, may comprise the steps of, transmitting each of the plurality of primary transmit beams to a second beam splitter which is arranged so that it is off-set from being parallel to said first beam splitter; and for each of the plurality of primary transmit beams, splitting the primary transmit light beam using the second beam splitter to form a first light beam which is reflected from the second beam splitter to form a first secondary transmit beam and a second light beam which is transmitted through the second beam splitter, passing the second light beam to a second mirror and reflecting the second light beam, using the second mirror, back to the second beam splitter; splitting the second light beam using the second beam splitter to form a third light beam which forms a second secondary transmit beam, and a fourth light beam; reflecting the fourth light beam back to said second mirror, using the second beam splitter, using the fourth light beam to generate a plurality of secondary transmit beams, wherein each of the plurality of secondary transmit beams are generated by splitting a light beam which has been reflected from the second mirror to the second beam splitter to form a secondary transmit beam and a reflective beam which is reflected back to the mirror.

The second interferometer may comprise a second beam splitter and second mirror which are arranged in optical communication, and wherein the second beam splitter may have a planar surface and the second mirror may have a planar reflective surface, and wherein the method may further comprise the step of arranging the second mirror and/or second beam splitter of the second interferometer so that the planar reflective surface of the second mirror is off-set from being parallel to the planar surface of the second beam splitter.

Preferably the method comprises the step of arranging the second mirror and/or second beam splitter of the second interferometer so that the planar reflective surface of the second mirror is orientated at an angle of between 0.001°- 90° to the planar surface of the second beam splitter. Most preferably the method comprises the step of arranging the second mirror and/or second beam splitter of the second interferometer so that the planar reflective surface of the second mirror is orientated at an angle of between 0.01°-2° to the planar surface of the second beam splitter.

The second interferometer may comprise a second beam splitter and second mirror which are arranged in optical communication, and wherein the second beam splitter may have a planar surface and the second mirror may have a planar reflective surface, and wherein the method may further comprise the step of arranging the second mirror and/or second beam splitter of the second interferometer so that the planar reflective surface of the second mirror is parallel to the planar surface of the second beam splitter.

The second beam splitter may have a planar surface and the second mirror may have a planar reflective surface, and the method may further comprise the step of arranging the second mirror so that its planar reflective surface is parallel to the planar surface of the second beam splitter.

The method may further comprise the step of arranging the first and second beam splitters such that they are off-set from being parallel to one another. Preferably the method further comprises the step of arranging the first and second beam splitters such that they are orientated at an angle of 45° to one another.

Advantageously, step of arranging the first and second beam splitters such that they are off-set from being parallel to one another will ensure that each of the plurality of primary transmit beams pass along a first plane and each of the secondary transmit beams which are generated from a primary transmit beam pass along a second plane. Advantageously, arranging the first and second beam splitters such that they are orientated at an angle of 45° to one another will ensure that each of the plurality of primary transmit beams pass along a first plane and each of the secondary transmit beams which are generated from a primary transmit beam pass along a second plane, wherein the first and second planes are perpendicular to one another.

Preferably the first and second beam splitters each have a planar profile.

Preferably the first and second mirrors each have a planar profile.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
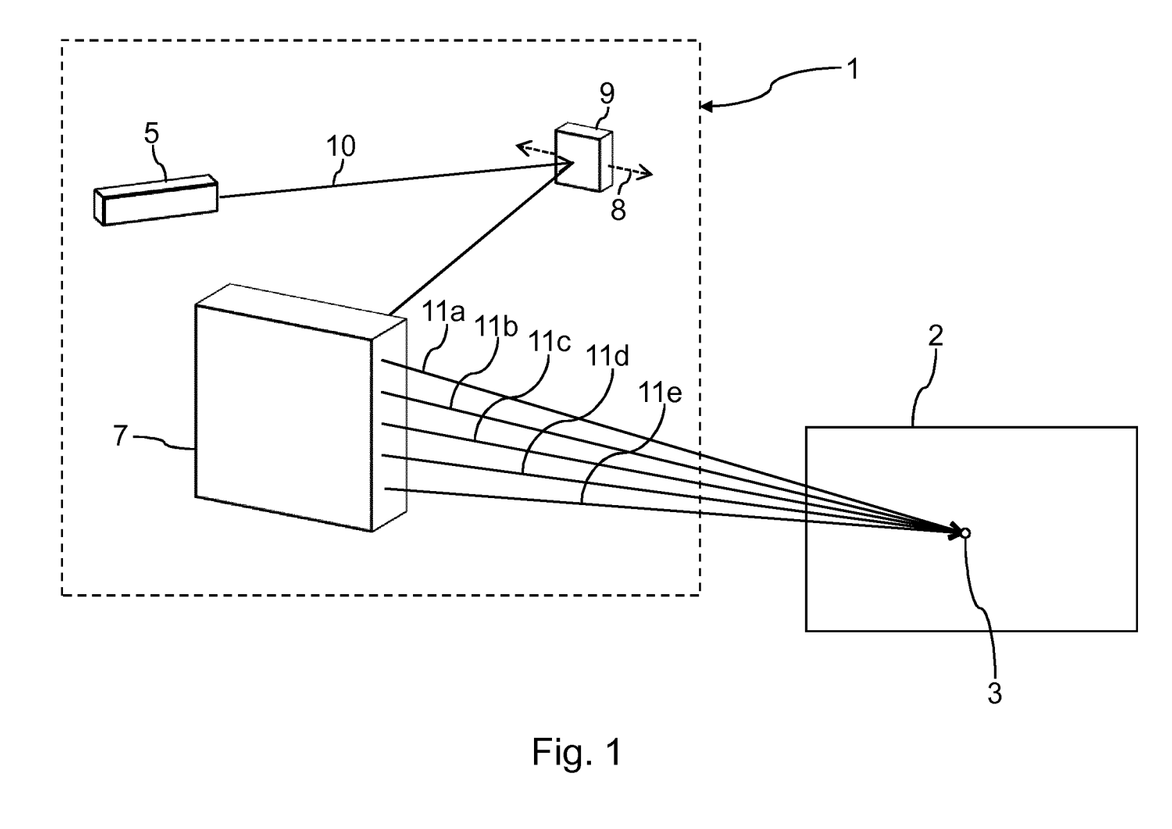
FIG. 1 illustrates a projection system which carries out a method according to an embodiment of the present invention.

FIG. 1 illustrates a projection system 1 which is configured to carry out a method according to an embodiment of the present invention, to project a pixel 3, with reduced speckle, onto a display screen 2.

An input light beam 10 is transmitted from a laser source 5 to a first interferometer 7 via a MEMS mirror 9. The MEMS mirror 9 is configured to oscillate about an oscillation axis 8 to scan the input light beam 10 in 1-dimension. It will be understood that the MEMS micro mirror 9 could alternatively be configured to oscillate about two orthogonal oscillation axis, to scan the input light beam 10 in 2-dimensions. Optionally, the MEMS mirror 9 may have a curved profile.

In the figure, it is understood that the MEMS mirror 9 can be any type of reflective component, such as array of digital micromirrors (DMD) or an array of Liquid Crystal On Silicon cells (LCOS) or a Liquid Crystal Display cells (LCD).

A plurality of primary transmit beams 11a-e are generated at the first interferometer 7 using the input light beam 10. Although, FIG. 1 illustrates that five primary transmit beams 11a-e are generated using the input light beam 10, it will be understood that any number, greater than two, of primary transmit beams 11a-e may be generated at the first interferometer 7 using the input light beam 10.

Figure 2A:
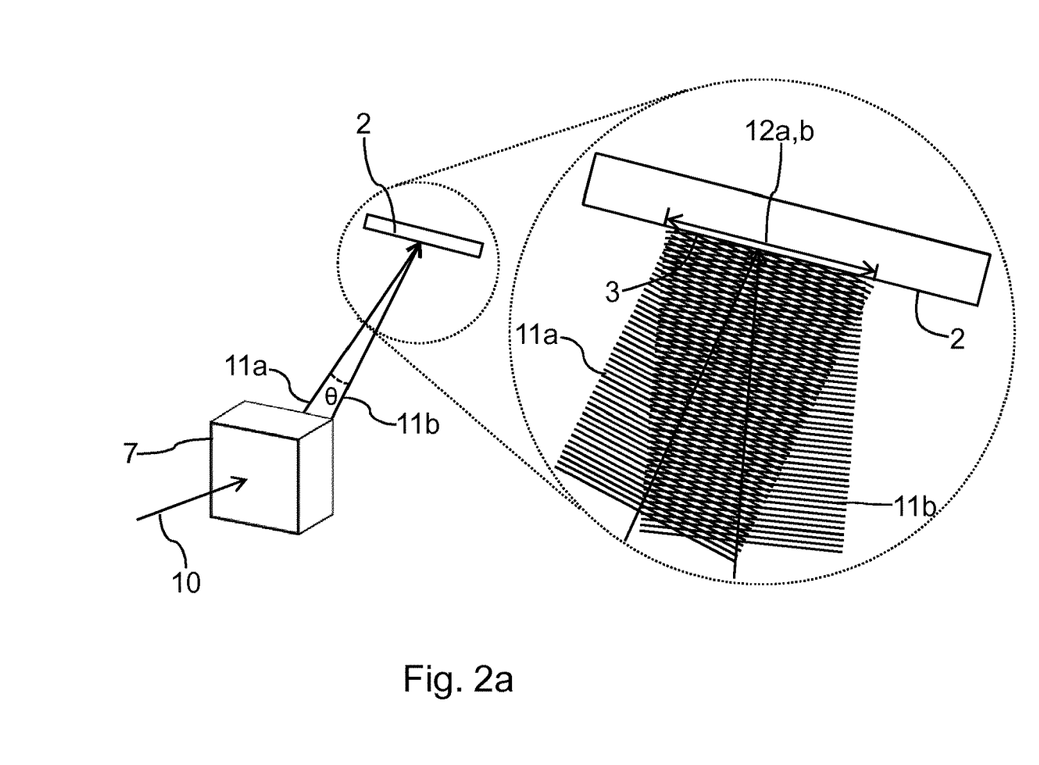
FIGS. 2a and 2b illustrate how interference fringes are formed.

The plurality of primary transmit beams 11a-e are then used to generate interference fringes, which reduce the speckle in the pixel 3, at a display screen 2. To generate interference fringes, the primary transmit beams 11a-e are each projected to a position on a display surface so that beam spots of each of the primary transmit beams 11a-e at least partially overlap. FIG. 2a illustrates how two 11a,b of the primary transmit beams 11a-e are projected from the first interferometer 7, to the same position on a display screen 2 so that beam spots 12a,b of each of the two primary transmit beams 11a,b at least partially overlap. In this example the beam spots 12a,b of each of the two primary transmit beams 11a,b fully overlap at the display screen 2, therefore the first interferometer 7 also focuses each of the primary transmit beams 11a,b to a single point on the display screen 2. Only two of the of the primary transmit beams 11a,b are illustrated in FIG. 2a for clarity purposes, it will be understood that in practice, the beam spots of all primary transmit beams 11a-e will fully overlap (or at least partially overlap) at the display screen 2.

Figure 2B:
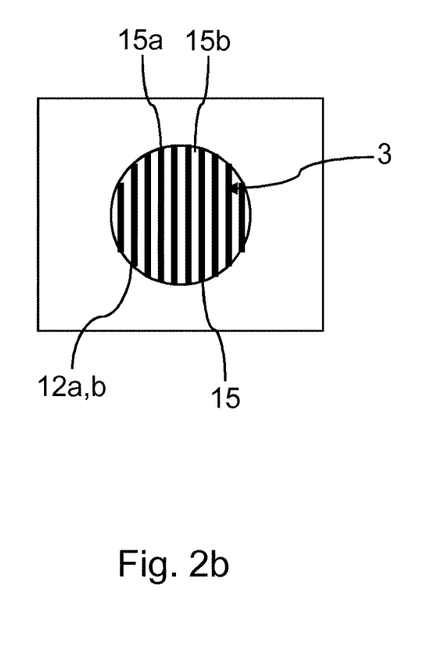

FIG. 2b, illustrates the interference fringes 15 which are generated with the beam spots 12a-e of the primary transmit beams 11 overlap at the display screen 2. The Interference fringes 15 are generated at the display screen 2 due to constructive and destructive interference between the primary transmit beams 11a-e when the beam spots 12a-e of the primary transmit beams 11 overlap at the display screen 2. It will be understood that if the beam spots 12a-e of the primary transmit beams 11a-e only partially overlap at the display screen 2, then interference fringes 15 will be generated only in the region where the beam spots 12a-e overlap.

Bright fringes 15a are generated where the primary transmit beams 11a-e are in phase at the display screen 2, and dark fringes 15b are generated at the display screen 2 where the primary transmit beams 11a-e are out of phase at the display screen 2. The overlapping beam spots 12-a-e of each of the primary transmit beams 11a-d define a pixel 3 on the display screen 2.

Figure 3:
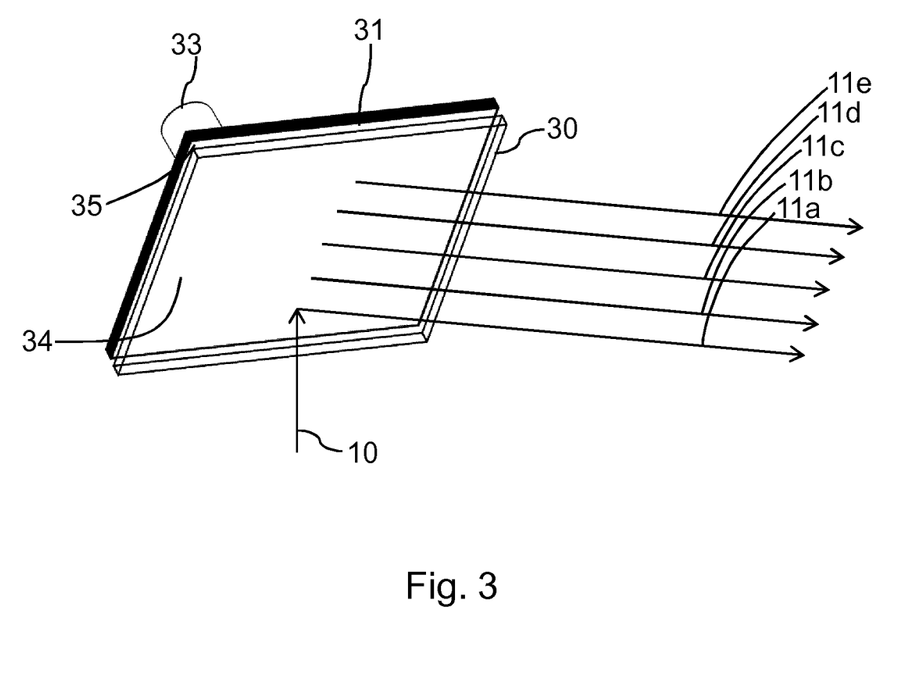
FIG. 3 provides a perspective view of the first interferometer.

FIG. 3 provides a perspective view of the first interferometer 7 used in the projection system 1. The first interferometer 7 comprises a first beam splitter 30 arranged in optical communication with a first mirror 31. The first beam splitter 30 comprises a planar surface 34. The first mirror 31 comprises a planar reflective surface 35. In this example the first beam splitter 30 and the first mirror 31 each have a planar profile.

An actuator 33 is operably connected to the first mirror 31 so that it can be optionally used move the first mirror 31. The actuator 33 may be optionally operated to oscillate the first mirror 31 about a pivot point (not shown). Advantageously, moving the first mirror 31 will cause the interference fringes 15 to move; thus further increasing the reduction in speckle at the display screen 2. Alternatively, or additionally, the actuator 33 may be operably connected to the first beam splitter 30, so that the first beam splitter 30 can be moved in addition to, or as an alternative, to moving the first mirror 31.

Figure 4:
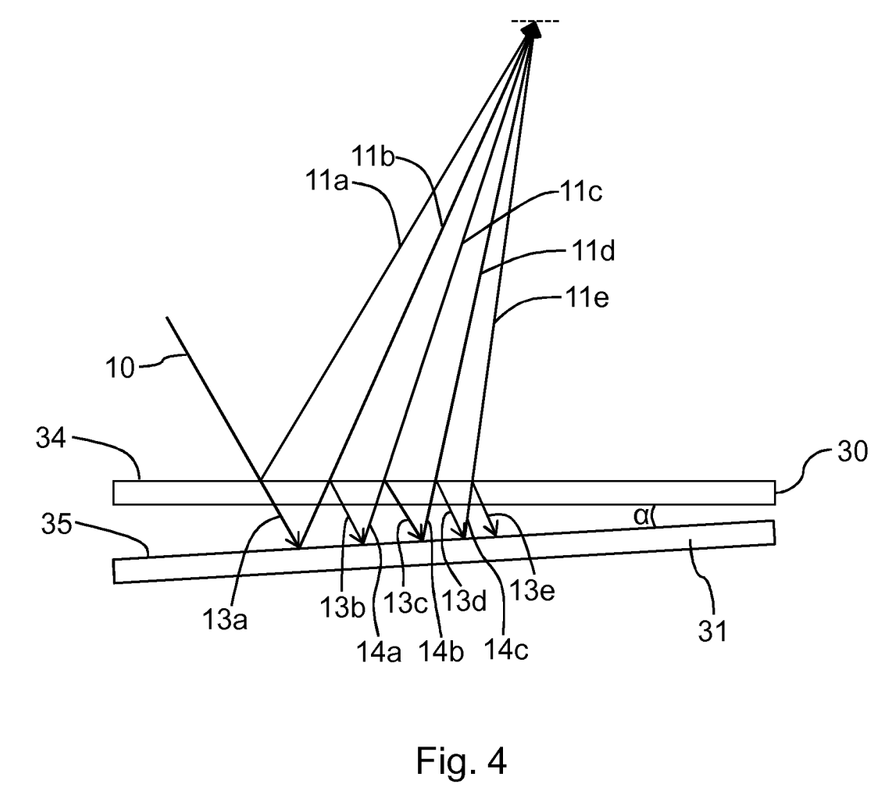
FIG. 4 provides a side view of the first interferometer and illustrates how the a plurality of primary transmit beams are generated at the first interferometer.

As illustrated in FIG. 2 the primary transmit beams 11a-e are focused to a single point on the display screen 2 so that the beam spots 12a-e of the primary transmit beams 11a-e overlap on the display screen 2 to define a pixel 3. To achieve the focusing of the primary transmit beams 11a-e the first mirror 31 and first beam splitter 30 are orientated so that the planar reflective surface 35 of the first mirror 31 is off-set from being parallel to the planar surface 34 of the first beam splitter 30. FIG. 4 provides a side view of the first beam splitter 30 and first mirror 31 of the first interferometer 7; the first mirror 31 and first beam splitter 30 are orientated so that a non-zero angle α exists between the planar reflective surface 35 of the first mirror 31 and the planar surface 34 of the first beam splitter 30. Preferably the angle α will be between 0.01°-2°.

FIG. 4 also illustrates how the plurality of primary transmit beams 11a-e are generated at the first interferometer 7 using the input light beam 10. The input light beam 10 is transmitted to a first beam splitter 30. The input light beam 10 is split using the first beam splitter to form a first light beam 11a which is reflected from the first beam splitter 30 to form a first primary transmit beam 11a and a second light beam 13a which is transmitted through the first beam splitter 30. The second light beam 13a is passed to the first mirror 31 and reflected by the first mirror 31, back to the first beam splitter 30. The second light beam 13a is split by first beam splitter 30 using to form a third light beam 11b which forms a second primary transmit beam 11b, and a fourth light beam 13b. The fourth light beam 13b is reflected back to said first mirror 31, by the first beam splitter 30. The fourth light beam 13b is then used to generate a plurality of primary transmit beams 11c-11e, wherein each of the plurality of primary transmit beams 11c-11e is generated by splitting a light beam 14a-c which has been reflected from the first mirror 31 to the first beam splitter 30 to form a primary transmit beam 11c-e and a reflective beam 13c-e which is reflected back to the first mirror 31.

Figure 5:
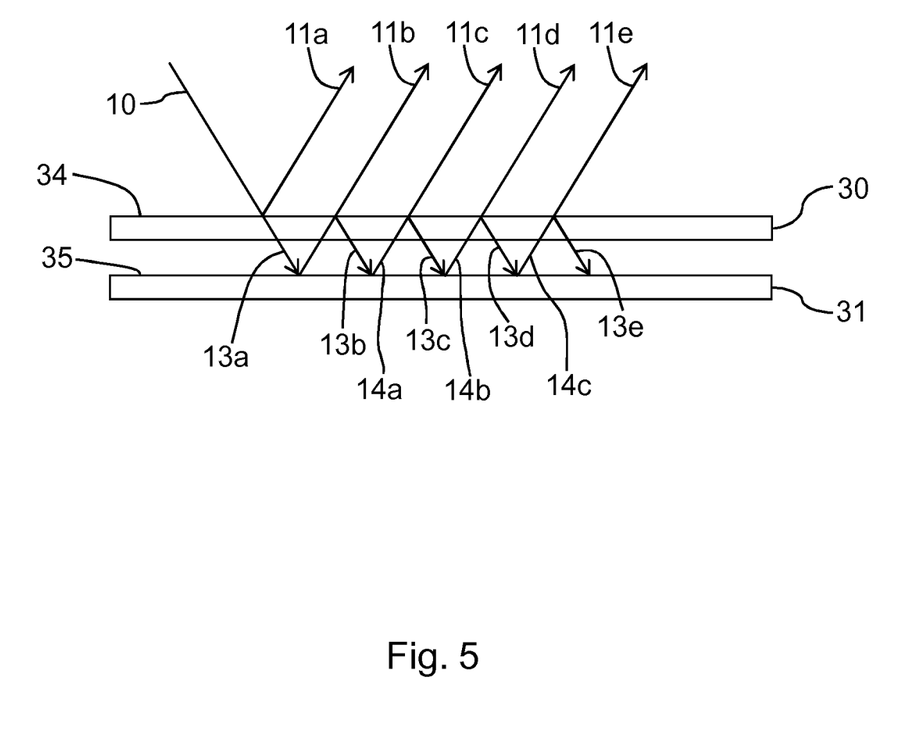
FIG. 5 provides a side view of the first interferometer which has an alternative configuration.

It will be understood that in cases where it is not required to focus the primary transmit beams 11a-e to a single point on the display screen 2, then the first mirror 31 and first beam splitter 30 may be orientated so that planar reflective surface 35 of the first mirror 31 and the planar surface 34 of the first beam splitter 30, are in parallel, as shown in FIG. 5. In this case the primary transmit beams 11a-e will be in parallel.

Figure 6:
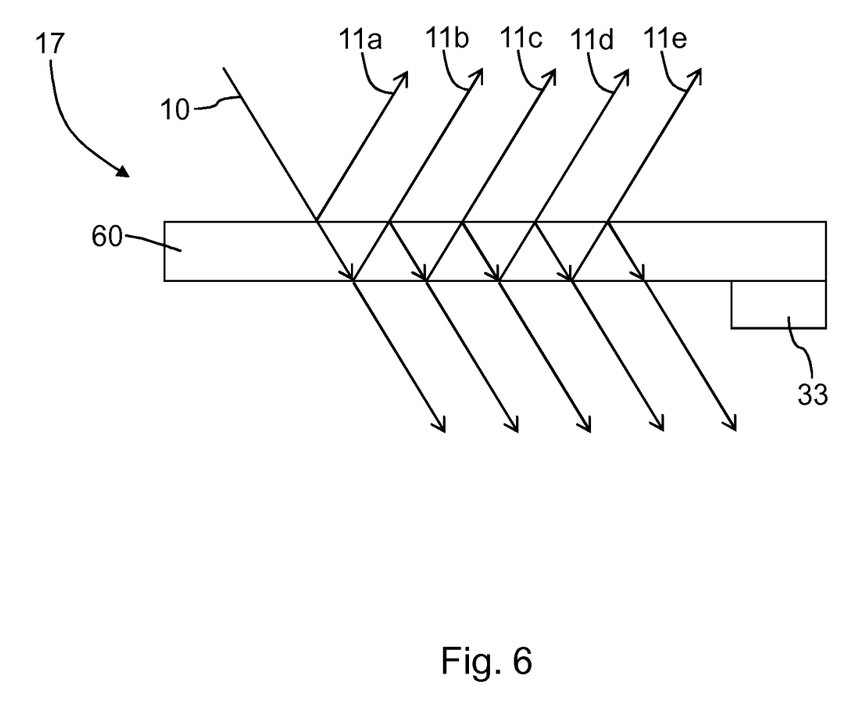
FIG. 6 provides a side view of an alternative first interferometer.

FIG. 6 provides a side view of another first interferometer 17 which may alternatively be used in the projection system 1. The first interferometer 17 comprises a first beam splitter 60 which is configured to provide a plurality of primary transmit beams 11a-e by means of partial internal reflection of the input light beam 10, along the first beam splitter 60. The portion of the input beam which is transmitted out of the first beam splitter 60 at each instant of partial internal reflection, defines a primary transmit beam 11a-e. The primary transmit beam 11a-e are overlapped, at least partially, at a display screen to form interference fringes which reduce speckle in a projected pixel. An actuator 33 is operably connected to the beam splitter so that the beam splitter 60 can be optionally moved, to move the interference fringes; this will result in a further reduction in speckle.

Figure 7:
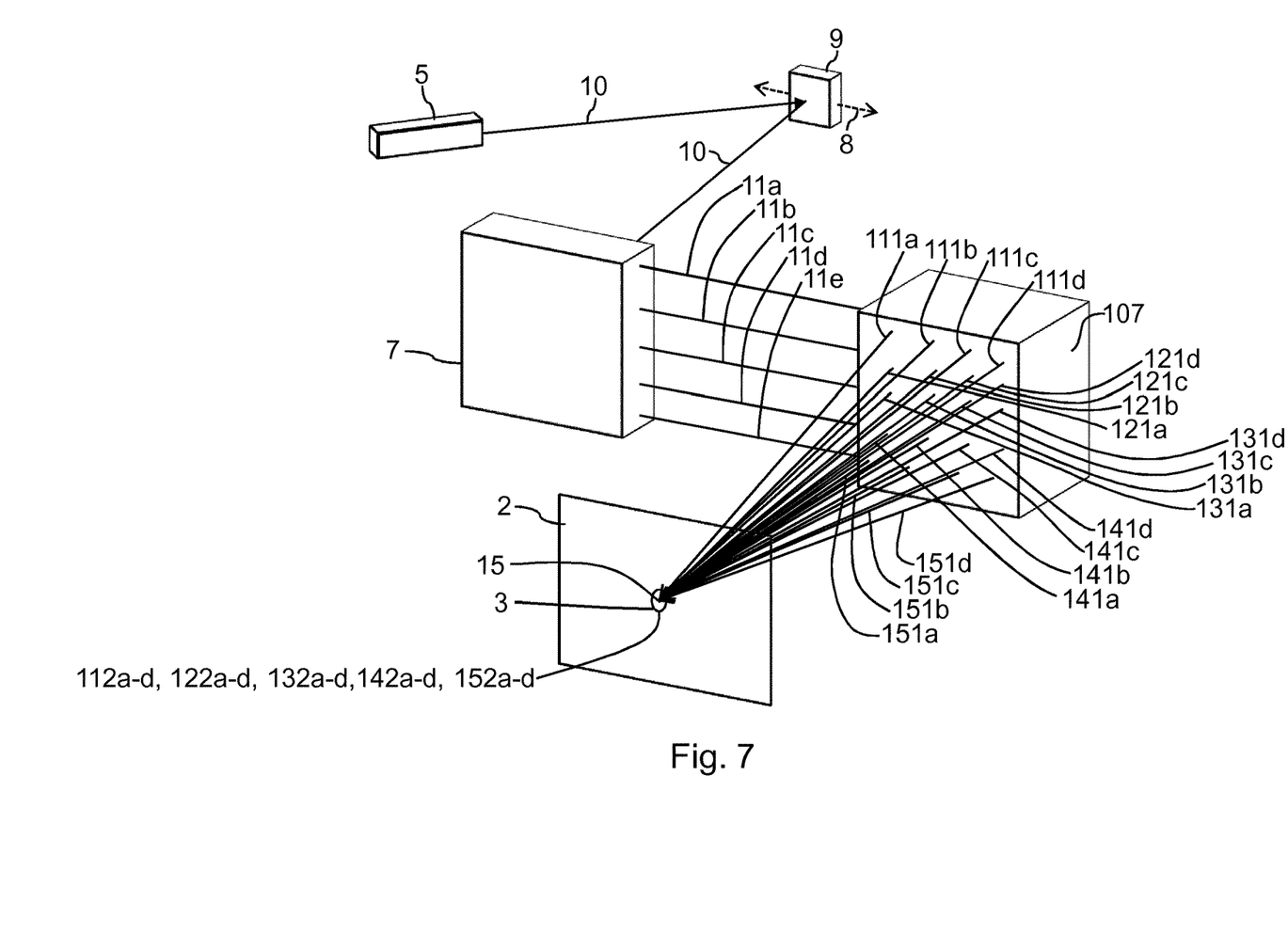
FIG. 7 provides a perspective view of a projection system which carries out a method according to a further embodiment of the present invention.

FIG. 7 illustrates a projection system 100 which carries out a method according to a further embodiment of the present invention. The projection system 100 has many of the same features as the projection system 1 shown in FIG. 1 and like features are awarded the same reference numbers. In the projection system 100 the primary transmit beams 11a-d are transmitted from the first interferometer 7 to a second interferometer 107, rather than directly to the display screen 2.

The second interferometer 107 may have some or all of the features of the first interferometers 7,17 discussed above. In this example the second interferometer 107 has the same features of the first interferometer shown in FIGS. 3 and 4; specifically the second interferometer 107 comprises a second beam splitter and a second mirror.

A plurality of secondary transmit beams 111a-d,121a-d, 131a-d, 141a-d, 151a-d are generated at the second interferometer 107 from each one of the primary transmit beams 11a-e. FIG. 7 illustrates that the second interferometer 107 generates four secondary transmit beams 111a-d, 121a-d, 131a-d,141a-d,151a-d from each one of the primary transmit beams 11a-e; secondary transmit beams 111a-d are generated from primary transmit beam 11a, secondary transmit beams 121a-d are generated from primary transmit beam 11b, secondary transmit beams 131a-d are generated from primary transmit beam 11c, secondary transmit beams 141a-d are generated from primary transmit beam 11d, secondary transmit beams 151a-d are generated from primary transmit beam 11e. However, it will be understood that any number, greater than two, of secondary transmit beams 111a-d,121a-d,131a-d,141a-d,151a-d may be generated at the second interferometer 107 from each one of the primary transmit beams 11a-e.

Figure 8:
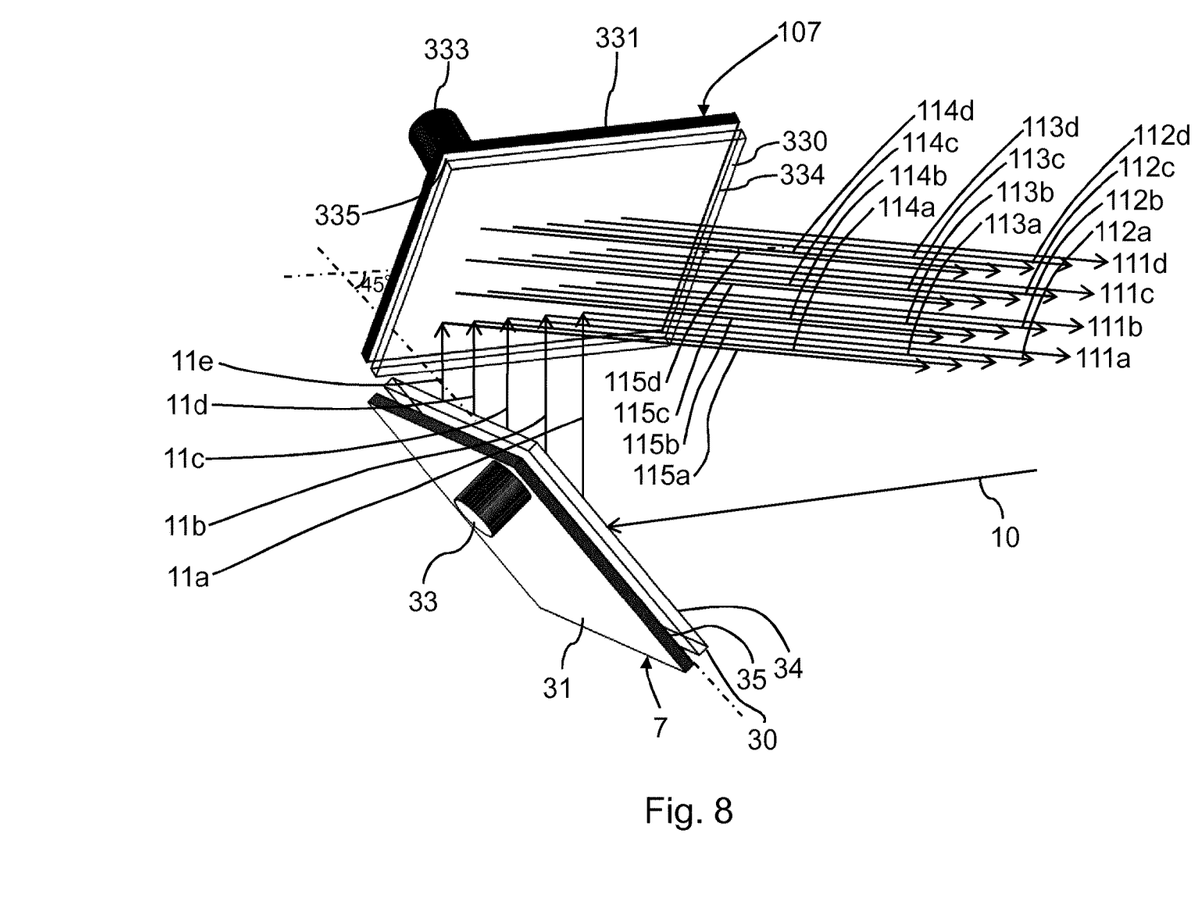
FIG. 8 provides a perspective view of the first and second interferometers used in the projection system shown in FIG. 7.

FIG. 8 provides a perspective view of the first and second interferometers 7,107 in the projection system 100. As discussed the second interferometer 107 has the same features of the first interferometer 7; therefore, the second interferometer 7 comprises a second beam splitter 330 arranged in optical communication with a second mirror 331. The second beam splitter 330 comprises a planar surface 334. The second mirror 331 comprises a planar reflective surface 335. In this example the second beam splitter 330 and the second mirror 331 each have a planar profile. An actuator 333 is operably connected to the second mirror 331 so that it can be optionally used move the second mirror 331. The actuator 333 may be optionally operated to oscillate the second mirror 31 about a pivot point (not shown). Advantageously, moving the second mirror 31 will cause the interference fringes 15 to move; thus further increasing the reduction in speckle at the display screen 2. Alternatively, or additionally, the actuator 333 may be operably connected to the second beam splitter 330, so that the second beam splitter 330 can be moved in addition to, or as an alternative to, moving the first mirror 331.

The first and second beam splitters 30,330 of the first and second interferometers 7,107 are orientated such that the planar surfaces 34,334 of each beam splitter 30,330 are off-set from being parallel to one another. Specifically, the first and second beam splitters 30,330 of the first and second interferometers 7,107 are orientated so that there is an angle of 45° between the planar surfaces 34,334 of the beam splitters 30,330.

Figure 9:
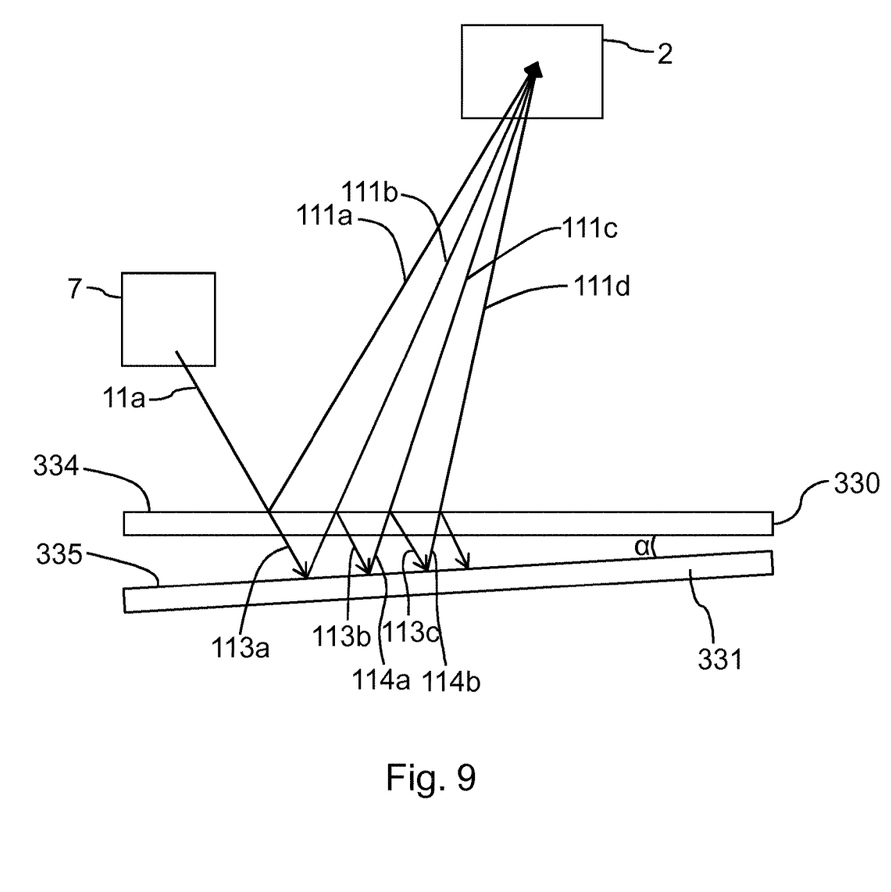
FIG. 9 provides a side view of the second interferometer and illustrates how the a plurality of secondary transmit beams are generated at the second interferometer.

FIG. 9 provides a side view of the second beam splitter 330 and second mirror 331 of the first interferometer 7; the second mirror 331 and second beam splitter 330 are orientated so that a non-zero angle $\alpha$ exists between the planar reflective surface 335 of the second mirror 31 and the planar surface 334 of the second beam splitter 30. Preferably the angle $\alpha$ will be between 0.01°-2°

Each of the plurality of secondary transmit beams 111a-d,121a-d,131a-d,141a-d,151a-d are generated at the second interferometer 107 in the same manner as the primary transmit beams 11a-e were generated at the first interferometer 7 from the input light beam 10. For clarity, FIG. 9 illustrates how secondary transmit beams 111a-d are generated from the primary transmit beam 11a only; however it will be understood that the same occurs for each of the primary transmit beams 11a-e to generate all the secondary transmit beams 111a-d,121a-d,131a-d,141a-d,151a-d.

Referring to FIG. 9, the primary transmit beam 11a is transmitted from the first interferometer 7 to the second beam splitter 330 of the second interferometer 107. The primary transmit beam 11a is split by the second beam splitter 330 to form a first light beam 111a which is reflected from the second beam splitter 330 to form a first secondary transmit beam 111a which is transmitted to the display surface 2, and a second light beam 113a which is transmitted through the second beam splitter 330. The second light beam 113a is passed to a second mirror 331 and reflected by the second mirror, back to the second beam splitter 330. The second light beam 113a, is then split by the second beam splitter 330 to form a third light beam 111b which forms a second secondary transmit beam 111b which is transmitted to the display surface 2, and a fourth light beam 113b. The fourth light beam 113b is reflected by the second beam splitter 330, back to said second mirror 331. The fourth light beam 113b is used to generate a plurality of secondary transmit beams 111c,111d, wherein each of the plurality of secondary transmit beams 111c,111d are generated by splitting a light beam 114a,b which has been reflected from the second mirror 331 to the second beam splitter 330 to form a secondary transmit beam 111c,111d and a reflective beam 113c which is reflected back to the second mirror 331.

All of the secondary transmit beams 111a-d,121a-d,131a-d,141a-d, 151a-d are projected to a position on a display surface 2 so that beam spots 112a-d,122a-d,132a-d,142a-d of all the secondary transmit beams 111a-d, at least partially overlap on a display surface 2 to create interference fringes 15 (in the same manner as described above for the previous embodiment) which reduce the speckle in the pixel 3. In this example the beam spots 112a-d,122a-d,132a-d,142a-d of each of the secondary transmit beams 111a-d,121a-d,131a-d,141a-d, 151a-d fully overlap at the display screen 2, therefore the first and second interferometers 7,107 also focus each of the secondary transmit beams 111a-d to a single point on the display screen 2. Preferably the first interferometer 7 focuses light beams along a first axis and the second interferometer 107 focuses light beams along a second axis, wherein the first and second axes are orthogonal; as a results the secondary light beams 111a-d,121a-d, 131a-d,141a-d,151a-d are focused along 2-dimensions to a single point on the display screen. The first and second interferometers 7,107 can each be configured to focus light beams by arranging the beam splitter 30 and mirror 31 of each interferometer 7,107 so that there is a non-zero angle between the beam splitter 30 and mirror 31 (as shown in FIG. 4 above).

Figure 10:
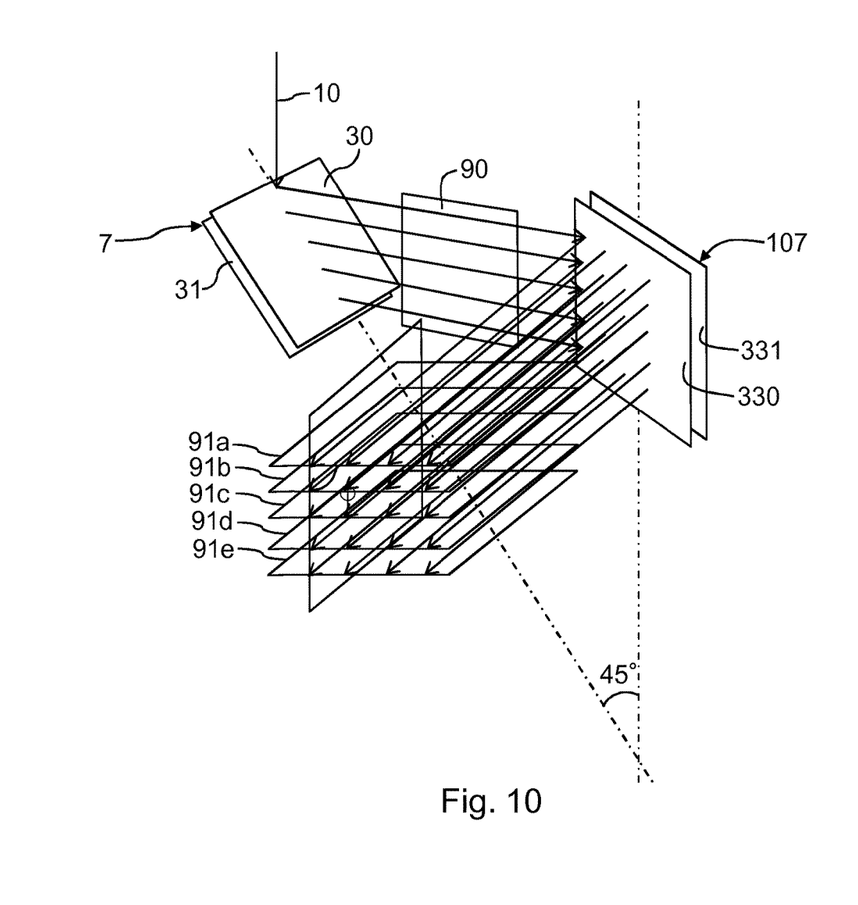
FIG. 10 provides a perspective view of the first and second interferometers illustrating how the plurality of primary and secondary transmit beams are orientated with respect to one another.

The orientation of the primary transmit beams 11a-d and secondary transmit beams 111a-d,121a-d,131a-d,141a-d, 151a-d is illustrated in FIG. 10. In the present example the primary transmit beams 11a-e which are generated from an input light beam 10, at the first interferometer 7, will lie on a first plane 90; each of the secondary transmit beams 111a-d,121a-d,131a-d,141a-d,151a-d which are generated from the primary transmit beams 11a-e, at the second interferometer 107, will lie on second planes 91a-d (the secondary transmit beams 111a-d will lie on a second plane 91a, the secondary transmit beams 121a-d will lie on a second plane 91b, the secondary transmit beams 131a-d will lie on a second plane 91c, the secondary transmit beams 141a-d will lie on a second plane 91d, the secondary transmit beams 151a-d will lie on a second plane 91e). To ensure that the primary transmit beams 11a-d and secondary transmit beams 111a-d,121a-d,131a-d,141a-d,151a-d, lie on different planes, the first and second beam splitters 30,330 of the first and second interferometers 7,107 should be arranged such that they are off-set from being parallel to one another. In the example shown in FIG. 10 each of the second planes 91a-d are perpendicular to the first plane 90, and parallel to one another; to achieve this desired orientation of primary transmit beams 11a-d and secondary transmit beams 111a-d,121a-d,131a-d,141a-d,151a-d the first and second beam splitters 30,330 should be orientated such that they are at an angle of 45° to one another. Such an arrangement provides 2-dimensional interference fringes; so each beam spot will comprise 2-dimensional interference fringes. The 45° angle between the beam splitters 30,330 ensures that the 2-dimensional interference fringes will comprises interference fringes which are orthogonal to one another.

Advantageously, as a plurality of secondary transmit beams are used to define the pixels of an image; this reduces the risk of eye damage if a user enters a projection cone of the project device 1,100. For example, if a user enters a projection cone of the projection device 1,100, the eye of the user will be exposed to only a portion of the light beams which define the pixel 3, thus reducing the risk of eye damage.

Figure 11:
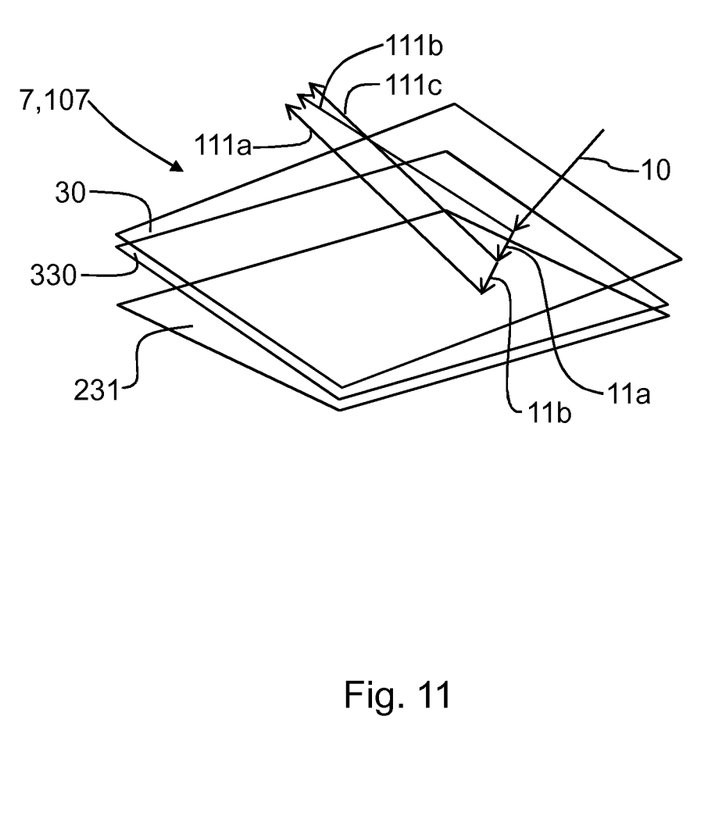
FIG. 11 provides a perspective view of an alternative arrangement for the first and second interferometers.

FIG. 11 provides a perspective view of an alternative arrangement for the first and second interferometers 7,107. The first and second interferometers 7,107 each comprise a beam splitter 30,330 and share a single mirror 231. Otherwise the first and second interferometers 7,107 operate in the same manner as described above to generate primary and secondary transmit beams.

It will be understood that the methods and projection systems described above could be used in many different applications; for example optical coherence tomography, head up displays, head mounted displays, microlens arrays, laser projection systems for cinemas, rear projection displays, lithography, DMD or LCOS or GLV optical engines, laser illumination (microscopy, holography), and LIDAR.

As a further option, binary phase code could be provided a mirror 31,331 of either of the first and/or second interferometers. Binary phase code is simply projections provided on the reflective surface of the mirror 31,331. The binary phase code may be used to introduce lines perpendicular to the fringes so that dots would be scanned instead of lines.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. A method to reduce speckle effects in a projected image, the method comprising:
   transmitting an input light beam to a first interferometer;
   generating a plurality of primary transmit beams at the first interferometer based in part on the input light beam, each of the plurality of primary transmit beams to generate a respective beam spot at a display surface; and
   transmitting the plurality of primary transmit beams to a position on the display surface to cause the beam spots generated by the plurality of primary transmit beams to partially overlap to generate one or more interference fringes at the display surface.

2. The method according to claim 1, comprising:
   transmitting the plurality of primary transmit beams to a second interferometer;
   generating a plurality of secondary transmit beams at the second interferometer based in part on the plurality of primary transmit beams; and
   transmitting the plurality of secondary transmit beams to a position on the display surface to cause second beam spots, generated by the plurality of secondary transmit beams, to at least partially overlap.

3. The method according to claim 2, the second interferometer comprising a second beam splitter arranged in optical communication with a second mirror, the method comprising at least one of moving the second mirror or moving the second beam splitter.

4. The method according to claim 1, comprising directing, by a MEMS mirror, a light beam from a light source to the first interferometer, the MEMS mirror to oscillate about at least one oscillation axis to scan the input light beam.

5. The method according to claim 1, comprising directing, by an array of digital micromirrors, a light beam from a light source to the first interferometer.

6. The method according to claim 1, comprising directing, by an array of Liquid Crystal On Silicon cells or an array of Liquid Crystal Display cells, a light beam from a light source to the first interferometer.

7. The method according to claim 1, the first interferometer comprising a first beam splitter arranged in optical communication with a first mirror, the method comprising at least one of moving the first mirror or moving the first beam splitter.

8. The method according to claim 1, the first interferometer comprising a first beam splitter arranged in optical communication with a first mirror, the method comprising:
   transmitting the input light beam to the first beam splitter;
   splitting the input light beam to form a first light beam and a second light beam;
   reflecting the first light beam to form a first primary transmit beam of the plurality of primary transmit beams;
   transmitting the second light beam to the first mirror;
   transmitting the second light beam, using the first mirror, back to the first beam splitter;
   splitting the second light beam to form a third light beam and a fourth light beam;
   reflecting the third light beam to form a second primary transmit beam of the plurality of primary transmit beams; and
   reflecting the fourth light beam to the first mirror.

9. The method according to claim 1, the first interferometer comprising a first beam splitter and a first mirror arranged in optical communication, and wherein the first beam splitter has a planar surface and the first mirror has a planar reflective surface, and wherein the method further comprises the step of arranging at least one of the first mirror or the first beam splitter of the first interferometer so that the planar reflective surface of the first mirror is offset from being parallel to the planar surface of the first beam splitter.

10. A system comprising:
a light source to generate an input light beam; and
a first interferometer to receive the input light beam and to generate a plurality of primary transmit beams based in part on the input light beam, each of the plurality of primary transmit beams to generate a respective spot beam at a display surface, the plurality of spot beams to partially overlap on the display surface to generate one or more interference fringes at the display surface.

11. The system according to claim 10, comprising a second interferometer to receive the plurality of primary transmit beams and to generating a plurality of secondary transmit beams based in part on the plurality of primary transmit beams.

12. The system according to claim 11, the second interferometer comprising a second beam splitter arranged in optical communication with a second mirror.

13. The system according to claim 10, comprising a MEMS mirror to direct the input light beam to the first interferometer, the MEMS mirror to oscillate about at least one oscillation axis to scan the input light beam.

14. The system according to claim 10, comprising an array of digital micromirrors to direct the input light beam to the first interferometer.

15. The system according to claim 10, an array of Liquid Crystal On Silicon cells or an array of Liquid Crystal Display cells to direct the input light beam to the first interferometer.

16. The system according to claim 10, the first interferometer comprising a first beam splitter arranged in optical communication with a first mirror.

17. The system according to claim 10, the first interferometer comprising a first beam splitter and a first mirror arranged in optical communication, the first beam splitter having a planar surface and the first mirror having a planar reflective surface.

18. The system according to claim 17, comprising an actuator to adjust and angle between the first beam splitter and the first mirror to change a point at which the plurality of primary transmit beams will be focused on the display surface.

* * * * *